United States Patent [19]
Sommer

[11] Patent Number: 6,026,199
[45] Date of Patent: Feb. 15, 2000

[54] METHOD AND APPARATUS FOR HALFTONING GREY VALUE SIGNALS

[75] Inventor: Monique G. M. Sommer, Eindhoven, Netherlands

[73] Assignee: Oce—Technologies B.V., Ma Venlo, Netherlands

[21] Appl. No.: 08/950,997

[22] Filed: Oct. 15, 1997

[30] Foreign Application Priority Data

Oct. 15, 1996 [NL] Netherlands ............................ 1004279

[51] Int. Cl.[7] .............................. G06K 9/36; G06K 9/38; G06K 9/46
[52] U.S. Cl. ........................... 382/252; 382/237; 358/456
[58] Field of Search .................................. 358/455, 456, 358/458; 382/237, 251, 252, 266

[56] References Cited

U.S. PATENT DOCUMENTS

| | | |
|---|---|---|
| 4,876,610 | 10/1989 | Ohsawa et al. . |
| 4,878,125 | 10/1989 | Katayama et al. . |
| 5,140,432 | 8/1992 | Chan . |
| 5,363,210 | 11/1994 | Sasaki et al. .............................. 382/266 |
| 5,515,456 | 5/1996 | Ballard .................................... 382/252 |

FOREIGN PATENT DOCUMENTS

| | | |
|---|---|---|
| 0356225 | 8/1989 | European Pat. Off. . |
| 91 06174 | 5/1991 | WIPO . |

OTHER PUBLICATIONS

"Digital Halftoning" by Robert Ulichney, Chapter 8 of MIT Press, 1987, p. 238–279.

Fox et al., "Multiple Error correction Algorithm for Halfton, Continuous Tone and Text Reproduction," IBM Technical Disclosure Bulletin, vol. 23, No. 10 (Mar. 1981) pp. 4433–4435.

Eschbach et al., "Analytic Description of the 1–D Error Diffusion Technique for Halftoning," Optics Communications, vol. 52, No. 3 (Dec. 1, 1984) pp. 165–168.

*Primary Examiner*—Thomas D. Lee

[57] ABSTRACT

The invention relates to the halftoning of grey values of pixels obtained by a photoelectric scanning of an image. The grey values of the pixels for processing are thresholded, the quantisation error which occurs in these circumstances being added to the grey value of an adjacent yet to be thresholded and situated in a first or second direction of the image. The selection of a pixel in the first or second direction is determined in these conditions by the differences in grey values of not more than two pixels arranged in both directions and situated in the vicinity of the thresholded pixel. The pixel is preferably selected in the direction in which the smallest difference in grey value is encountered, i.e. not in the direction of the grey value gradient but exactly perpendicularly to it. It has been found that the edge transitions can be reproduced most sharply in this way.

19 Claims, 5 Drawing Sheets

METHOD AND APPARATUS FOR HALFTONING GREY VALUE SIGNALS

BACKGROUND OF THE INVENTION

1. Field of the Invention

The invention relates to a method of halftoning grey values of pixels obtained by a photoelectric scanning of an image. The invention also relates to an image reproduction apparatus for reproducing grey value signals of an image produced by photoelectric scanning.

2. Description of Related Art

If an image is scanned photoelectrically, e.g. by a CCD scanner, grey values are obtained which correspond to surface coverages of different image elements of an image, i.e. pixels. The number of different grey values possible in such cases is determined by the characteristics of the CCD scanner and the extent of its dynamic range. If an analogue grey value generated by a CCD scanner is represented, for example, by a digital 8-bit code, then 256 possible different grey values are possible. If such grey value information is reproduced by image reproduction devices such as, for example, electrophotographic printers or inkjet printers, this grey value information must be converted into the degrees of coverage to be reproduced by such apparatus. Generally, only two possible degrees of coverage have to be reproduced, with toner powder in the case of electrophotography, or with ink in the case of an inkjet printer, these two possible degrees being white or black depending on the presence or absence of toner powder or ink. The multivalent grey values then have to be converted to not more than two grey values corresponding to white or black. If the ratio of the number of white and black pixels over a specific area is determined by the original grey value, an impression of the original grey value can be approximated. This method of reproducing grey values by way of a limited number of degrees of coverage is designated halftoning.

Generally, halftoning methods can be classified either under the designation of dithering or the designation of error diffusion. In the case of dithering, the pixels are divided up into contiguous groups of fixed dimensions, known as dither matrices, by which the grey value impression is approximated as well as possible for each group. Dithering has the disadvantage of reduced reproduction of detailed image information since the resolution is determined by the dimensions of the dither matrix.

Error diffusion does not have this disadvantage, since in this case the process is carried out for each pixel. A grey value for a pixel is rounded off to a bivalent binary value by thresholding, such value representing a minimum or a maximum surface coverage, the quantisation error which occurs in these circumstances being distributed over grey values of a number of neighbouring pixels yet to be thresholded. By distributing or diffusing the quantisation error over the immediate vicinity of the pixel, an approximation of the original grey value is finally obtained over a larger number of pixels. Chapter 8 of "Digital Halftoning" by Ulichney, Robert, MIT Press, 1987, describes a number of error diffusion methods. One known distribution of the quantisation error over neighbouring pixels is known as Floyd and Steinberg. In this case, the quantisation error is distributed over four neighbouring pixels in accordance with a fixed distribution code.

However, despite the fact that error diffusion is a pixel processing operation, a sharp edge transition may be reproduced fuzzily in an image as a result of the distribution of the quantisation error over a number of pixels. The prior art describes a number of devices in which error diffusion is applied at edge transitions.

For example, U.S. Pat. No. 4,876,610 describes an image reproduction apparatus using error diffusion, in which distribution of the quantisation error outside edge transitions in the image takes place over 12 neighbouring pixels in accordance with the Jarvis and Judice distribution, while at edge transitions it takes place over four adjacent pixels in accordance with the Floyd and Steinberg distribution. Edge transitions are determined by filtering the image signals through a two-dimensional Laplace filter followed by thresholding. Although restricting the diffusion area at edge transitions gives an improved reproduction thereof, fuzziness is still possible.

U.S. Pat. No. 4,878,125 also applies the distribution of the quantisation error over 12 pixels in the case of an edge transition. This is done to the extent that the distribution of the quantisation error in non-edge areas is effected uniformly with substantially identical weighting factors while at edge zones it is effected with a high concentration with a considerable difference in weighting factors. Edge transitions are detected either by a two-dimensional Laplace filter or by a detection of minimum and maximum grey values in a block of pixels. Nevertheless, fuzziness of an edge can always occur locally.

Another disadvantage of the apparatus described in the said patents is the complex character thereof. In both cases, two different sets of weighting coefficients are required for the distribution of the quantisation error as well as the necessary buffers and circuits for the edge transition detection. In addition, multiplying the quantisation error with different weighting coefficients also necessitates the required capacity.

U.S. Pat. No. 5,140,432 even uses a number of sets of different weighting distributions which differ from one another in diffusion length, in variation of the magnitude of the weighting factors, and in the direction of the diffusion. In addition, it is not only the presence of an edge transition that is detected, but also its direction and slope. This determination is based on grey values of a large number of pixels. A gradient is determined for a number of sub-superpixels of a size of 3×3 pixels. A profile of an edge transition is then determined over a superpixel which in turn contains 4×5 such sub-superpixels. A "profile comparator" is used to select a specific set of weighting coefficients. A set is selected which fits the profile found. This implies that the direction of the diffusion takes place primarily in the direction of the gradient of the edge transition. The size of the diffusion area is also inversely proportional to the size of this gradient.

The complexity of this apparatus is self-evident. A large number of pixels with associated processing operations are still involved in the detection of an edge transition and diffusion of the quantisation error.

Apart from their complexity, the said apparatus in the above patents are characterised by adaptation of the diffusion area at an edge transition to a less large area than is the case in areas without edge transitions. An apparatus which carries out no diffusion at all at edge transitions is known from WPT Patent Application 9106174. However, this has the disadvantage of reduced reproduction of the grey value of an edge transition.

Chapter 8.3.1 of the above-mentioned "Digital Halftoning" by Ulichney describes a very simple embodiment of error diffusion in which the quantisation error is distributed over only one pixel. In this case there is accordingly no necessity for multiplication of a quantisation error in accordance with a specific weighting factor. As already indicated hereinbefore, however, this gives rise to the incidence of line-like tracks of identical pixel values in the halftoned image. A solution is offered to counteract the formation of these regular tracks. This consists of a random choice of a pixel over which the quantisation error is diffused. As described hereinbefore, the addition of a random component to the weighting factors in the case of error diffusion over several pixels is a suitable method of counteracting the incidence of regular structures in such an embodiment. A disadvantage, however, is that a random generator also contributes to the complexity. In addition, a random choice at edge transitions of a pixel over which the quantisation area is distributed or a random choice of that part of the quantisation error that is to be distributed over a specific pixel in turn again gives rise to fuzzy edge transitions.

SUMMARY AND OBJECTS OF THE INVENTION

The method according to the invention, on the other hand, has as its object to provide a simple method of halftoning based on error diffusion of grey values of pixels obtained by a photoelectric scanning of an image, with edge transitions being reproduced as sharply as possible.

For this purpose, the method of the invention comprises (for a given pixel) the steps of: a thresholding the grey value of the given pixel, determining the quantisation error occurring in these circumstances, determining a first difference in grey values of not more than two pixels arranged in a first direction of the image and situated near or containing the given pixel, determining at least a second difference in grey values of not more than two pixels arranged in at least a second direction of the image different from the first direction and situated near or containing the given pixel, selecting a yet-to-be-thresholded (YTBT) pixel arranged in the first or at least second direction with respect to the given pixel depending on the first and the at least second difference in grey values, and adding the entire quantisation error to the grey value of the selected pixel.

Grey values of pixels obtained by photoelectric scanning always contain a noise component produced by the scanner device. An image with a uniform surface coverage when scanned by a CCD will generate an analogue output signal to which the noise of the CCD and electronics coupled thereto is added. A digital version of such an output signal will also have this noise if the magnitude of the analogue noise corresponds to at least one grey value step of the digital signal.

In the method according to the invention, use is now conveniently made of this added noise. The difference between two grey value signals each having a noise component will have a virtually random variation in size, at least in the absence of edge transitions. If the selection of a pixel from one or more pixels is determined by the magnitude of this difference, such selection will also have a virtually random character. By further determining a difference in two directions, the selection obtained at edge transitions is not a random selection but is controlled by the direction of the edge transition and is therefore no longer random. This provides a very simple embodiment of error diffusion, in which random selection of the diffusion of the quantisation error is obtained in surfaces of constant grey values and a controlled non-random diffusion is obtained over a small area at edge transitions.

A first embodiment according to the invention is obtained by selecting a pixel arranged in the first direction in the case in which a first difference in grey value is smaller than the second difference in grey value and selecting a pixel arranged in the second direction in the case in which the first difference in grey value is greater than the second difference in grey value. In the latter case the quantisation error is distributed, not perpendicularly, but parallel to an edge transition. The diffusion direction thus follows the edge and the edge is less fuzzy.

If the pixels are distributed in rows and columns of pixels, another advantageous embodiment is obtained by determining the first difference in grey values of the given pixel and an adjoining pixel situated in the same row, determining the second difference in grey values of the given pixel and an adjoining pixel situated in the same column, in the case in which the first difference in grey values is smaller than the second difference in grey values, selecting the other adjoining pixel situated in the same row and in the case in which the first difference in grey value is greater than the second difference in grey values, selecting the other adjoining pixel situated in the same column.

The invention also relates to an image reproduction apparatus for reproducing images on an image receiving support, the apparatus comprising input means for receiving grey value signals of pixels obtained by photoelectric scanning of an image, quantisation means for thresholding a grey value signal of a given pixel in order to obtain a thresholded signal of the given pixel, reproduction means for reproducing pixels in accordance with thresholded signals from teh quantisation means, error means for determining a quantisation error signal corresponding to a difference between the grey value signal fed thereto and the corresponding thresholded signal of the given pixel for first difference means for generating a first grey value difference signal between not more than two grey value signals to be fed thereto of pixels arranged in a first direction in the image and which are situated near or containing the pixel for thresholding, second difference means for generating a second grey value difference signal between not more than two grey value signals to be fed thereto of pixels arranged in an at least second direction differing from the first direction of the image and situated near or containing the pixel for thresholding, selection means for generating a selection signal for selecting a pixel yet to be thresholded and situated either in the first or the second direction with respect to the given pixel, depending on the first and at least second grey value difference signal to be fed to the selection means, and addition means for adding the quantisation error signal to the grey value signal of the pixel selected in accordance with the selection signal.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a preferred embodiment of the present invention will be described with reference to the drawings.

Figure 1:
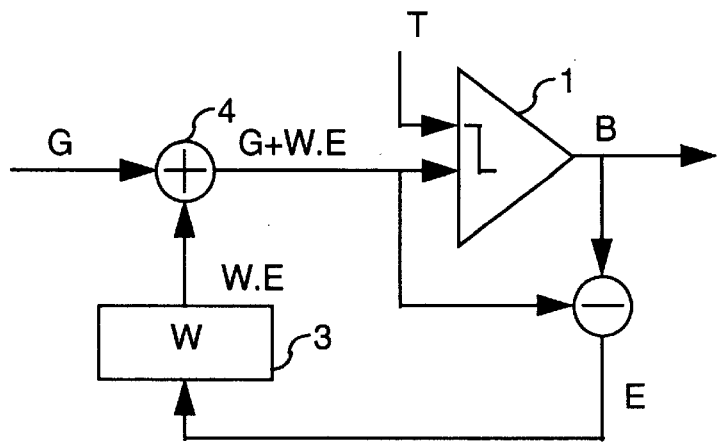
FIG. 1 is a diagram showing the error diffusion method.

FIG. 1 is a diagram showing an error diffusion method. Each multivalent grey value G of a pixel is in this case converted to a bivalent thresholded value B. In this case the grey value G corresponds to the degree of surface coverage of a pixel. In the case of a digital representation, for example by 8 bits, this may involve 256 different grey values. The term grey value will be used hereinafter in order to indicate that it is possible to represent more than two values in this way. It must also be remembered that the grey value G can also relate to the degree of surface coverage of an elementary colour of an image split into elementary colour images. The two possible values of the bivalent thresholded value B can in turn be related to a minimum and maximum surface coverage of toner powder or ink respectively in the case of an electrographic printer and an inkjet printer respectively.

By comparison with a threshold value T a grey value G is now converted in a threshold processor 1 to one of two possible values of the thresholded value B. This thresholded value B is then compared with the original grey value G in a difference determining step 2. The difference in value is designated the quantisation error E. This quantisation error E is stored in a quantisation error memory 3 for subsequent addition to following grey values of other neighbouring pixels which are still to be thresholded. This quantisation error E is distributed over grey values of different pixels with a specific weighting factor W in order to spread out the quantisation error E. The thus weighted quantisation error W×E is added, in an addition step 4, to a grey value G still to be thresholded, whereafter the grey value G+W×E thus corrected is subjected to the threshold processing 1. In the case of an image divided up into rows and columns of pixels, it is thus possible successively to convert the pixels row by row and for each row from left to right.

Figure 2A:
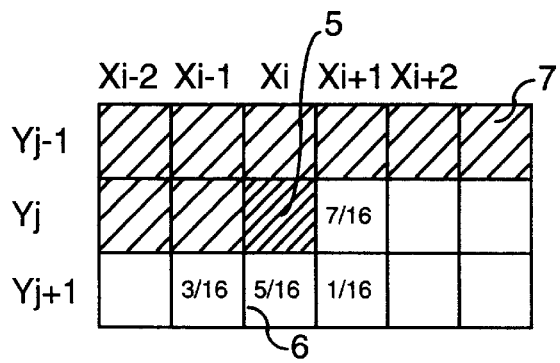
FIG. 2A shows a Floyd and Steinberg quantisation error distribution.
Figure 2B:
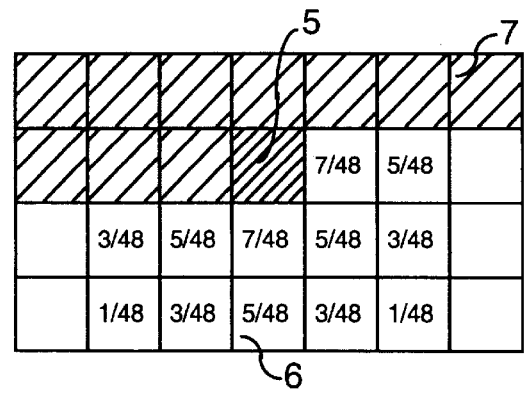
FIG. 2B shows a Jarvis, Judice and Ninke quantisation error distribution.

FIG. 2A is an example of a distribution of the quantisation error E in accordance with Floyd and Steinberg. The quantisation error E arising from the thresholding of pixel 5 with pixel co-ordinates $X_i$ and $Y_j$ is multiplied by the weighting factors indicated in the case of the pixels 6, for subsequent addition to the grey values of these pixels. Another example of the distribution of the quantisation error E is shown in FIG. 2B. This is known as the Jarvis, Judice and Ninke distribution. The already thresholded pixels 7 are shown by hatching in both Figures.

Figure 3A:
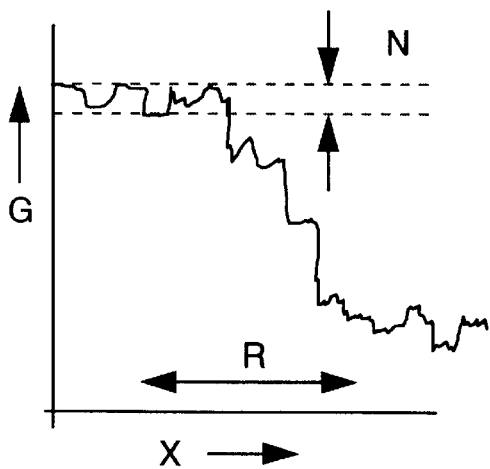
FIG. 3A shows the magnitude of the analogue grey value G obtained by photoelectric scanning against the scan position X of an image and FIG. 3B shows the corresponding digital grey value $G_{xi}$ against the discrete scanned position $X_i$.
Figure 3B:
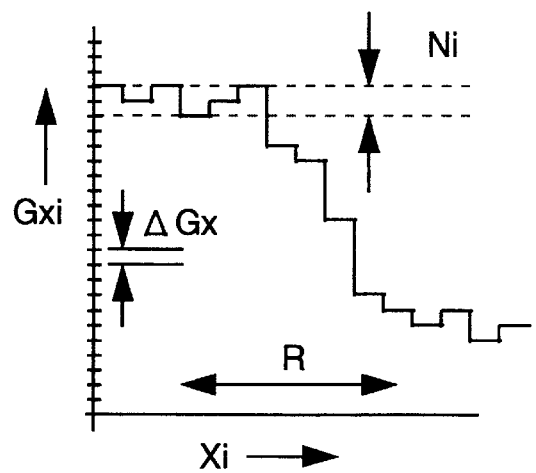

In FIG. 3A shows the magnitude of an analogue grey value signal G as obtained after photoelectric scanning of an image, against the position X on an image. In practice, the noise sources present in a photoelectric scanner, such as electronic amplifier circuits in combination with a CCD element, result in a specific quantity of arbitrarily fluctuating noise N therein. This applies even if the scanned image itself has a constant grey value. FIG. 3A also shows a marginal transition zone R where the measured grey value systematically varies. In FIG. 3B the digitised grey value $G_{xi}$ is shown against the pixel position $X_i$. The noise $N_i$ in this case has a digital character and corresponds to the size of a step in grey value $G_{xi}$.

The method and apparatus according to the invention now conveniently make use of this naturally present non-space-correlated noise in the scanned grey values G. The difference between two grey values G of two neighbouring pixels will, given an identical surface coverage of said pixels, have a specific value as a result of the noise. This difference is used to determine, in the method and apparatus according to the invention, the choice as to which pixel a quantisation error E obtained by thresholding is distributed. In zones having pixels with the same surface coverage or grey value, therefore, a random distribution of the quantisation error is obtained. As a result, in contrast to the previously mentioned error distributions, the diffusion of the quantisation error E can be restricted to a small area of the size of a few pixels. The random selection obviates regular patterns which would otherwise occur in the case of diffusion over such a small area. The small diffusion area further contributes to a greater edge sharpness than would be the case using the said larger diffusion areas. In addition, by distributing the quantisation error in its entirety over a maximum of one pixel, without using weighting factors, a particularly simple embodiment is obtained without multiplying by weighting factors.

Figures 4A, 4B, 4C:
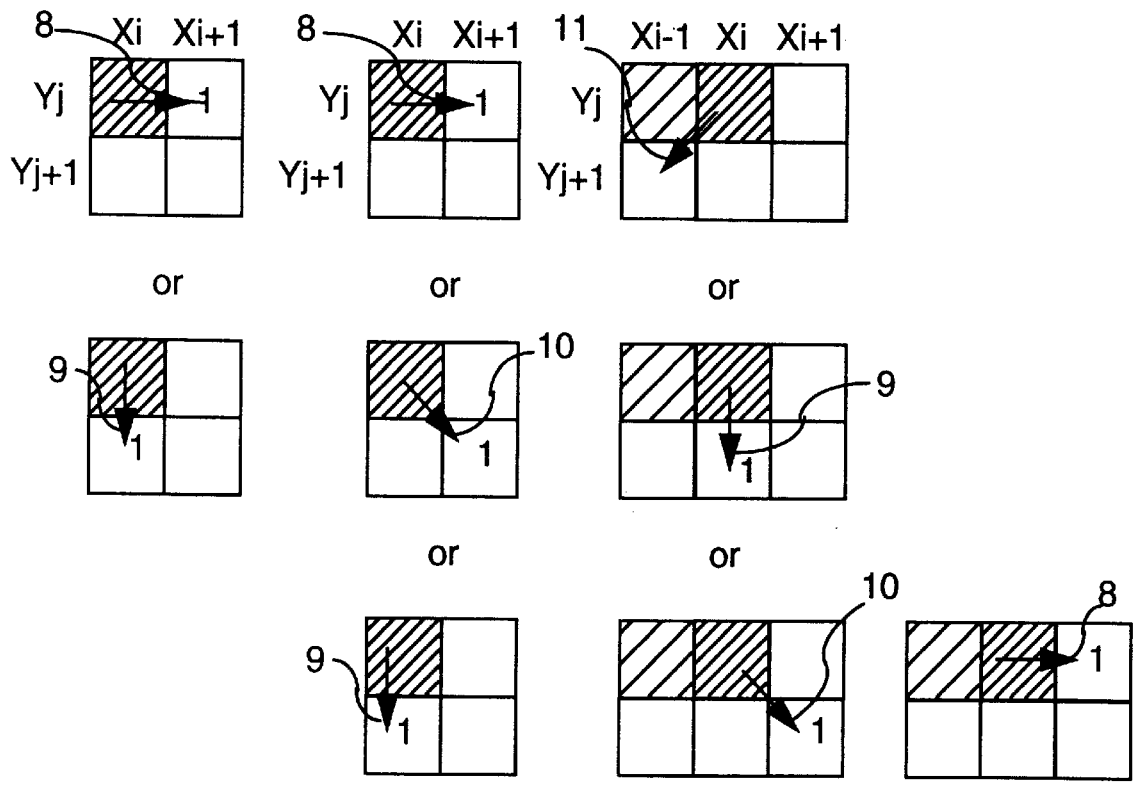
FIGS. 4A, B and C each show one possible embodiment of distributing the quantisation error according to the invention.

FIGS. 4A, 4B and 4C show a number of embodiments with a number of possible selections of pixels to which the quantisation error E can be distributed. In FIG. 4A the quantisation error E arising from the thresholding of the pixel with pixel co-ordinates $X_i$, $Y_j$ is distributed either over the pixel $X_{i+1}$, $Y_j$ situated to the right thereof in the direction 8, or over the pixel $X_i$, $Y_{j+1}$ situated therebeneath in the direction 9. FIG. 4B shows an example of three possible pixel positions $X_{i+1}$, $Y_j$; $X_{i+1}$, $Y_{j+1}$ and $X_i$, $Y_{j+1}$, over which a quantisation error E can be distributed. In this case the error can accordingly be passed on in the diagonal direction 10 to the pixel position $X_{i+1}$, $Y_{j+1}$ situated at the bottom right.

FIG. 4C shows another example of four possible pixel positions, $X_{i-1}$, $Y_{j+1}$; $X_i$, $Y_{j+1}$; $X_{i+1}$, $Y_{j+1}$ and $X_{i+1}$, $Y_j$ in four different directions 8, 9, 10 and 11. Essential to the said embodiments is both that the quantisation error E is distributed as a whole and in no more than one of at least two different directions. The purpose of this, as will be apparent hereinafter, is to be able to select pixels at an edge transition, in accordance therewith, for the purpose of good edge sharpness.

Figures 5A, 5B, 5C:
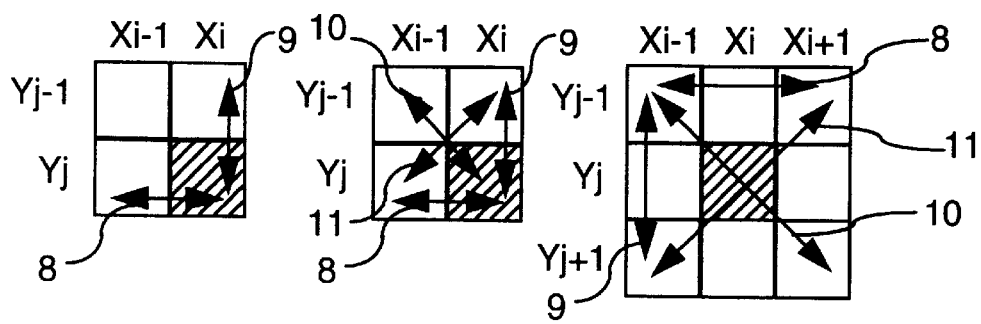
FIGS. 5A, B and C each show one possible embodiment for determining the selection signal in accordance with the invention.

FIGS. 5A, 5B and 5C show a number of other possible pixel positions whose grey values G can be used to enable the selection of a pixel position to be determined for diffusion of the quantisation error E in accordance with FIG. 4. In FIG. 5A the pixel values G of the pixel $X_{i-1}$, $Y_j$ on the left and the pixel $X_i$, $Y_{j-1}$ above the pixel for thresholding, with the pixel co-ordinates $X_i$, $Y_j$ are used. We are therefore looking in two different directions 8 and 9. If the difference in grey values G between the pixels $X_i$, $Y_j$ and $X_i$, $Y_{j-1}$ situated in the direction 9 is larger or smaller than the difference in the grey values G between the pixels $X_i$, $Y_j$ and $X_{i-1}$, $Y_j$ situated in the direction 8, then in a preferred embodiment the quantisation error E is distributed in the direction 8 and in the direction 9 respectively in accordance with FIG. 4A.

In surfaces having a constant grey value the selected diffusion direction will be random. However, in zones with a systematic change of grey value, e.g. at edge transitions at lines, the selection of pixels to which the quantisation error E is distributed will be determined by the direction of the edge transition. The random character will no longer be present at an edge transition. In this way a reproduced edge transition becomes less fuzzy. In the said preferred embodiment, the pixel is preferably selected in the direction in which the smallest difference in grey value is encountered, i.e. not in the direction of the grey value gradient but exactly perpendicularly thereto. It has been found that the edge transitions can be reproduced most sharply in this way.

In FIG. 5B, the difference in grey value is determined in four different directions 8, 9, 10 and 11. With regard to FIG. 5A, the difference in grey value G is also determined in two mutually perpendicular directions 10 and 11, which are situated diagonally with respect to the directions 8 and 9. This is achieved by an additional determination of the difference in grey value G between the pixels $X_i$, $Y_j$ and $X_{i-1}$, $Y_{j-1}$ in the third direction 10 and between the pixels $X_i$, $Y_{j-1}$ and $X_{i-1}$, $Y_j$ in the fourth direction 11. A suitable selection of pixels then contains not only pixels in directions 8 and 9 but also in the two diagonal directions 10 and 11 as shown in FIG. 4C. In the case of the maximum difference in grey value G in the first diagonal direction 10 a pixel is selected in the second diagonal direction 11 perpendicular to the first diagonal direction 10.

FIG. 5C shows another possible selection of pixels on the basis of which a difference in grey value G can be determined. Here the pixels are not contiguous. Generally, the selection of pixels by determining difference will be depend on the size of the edge transitions to be reproduced sharply in the image itself.

Figure 6:
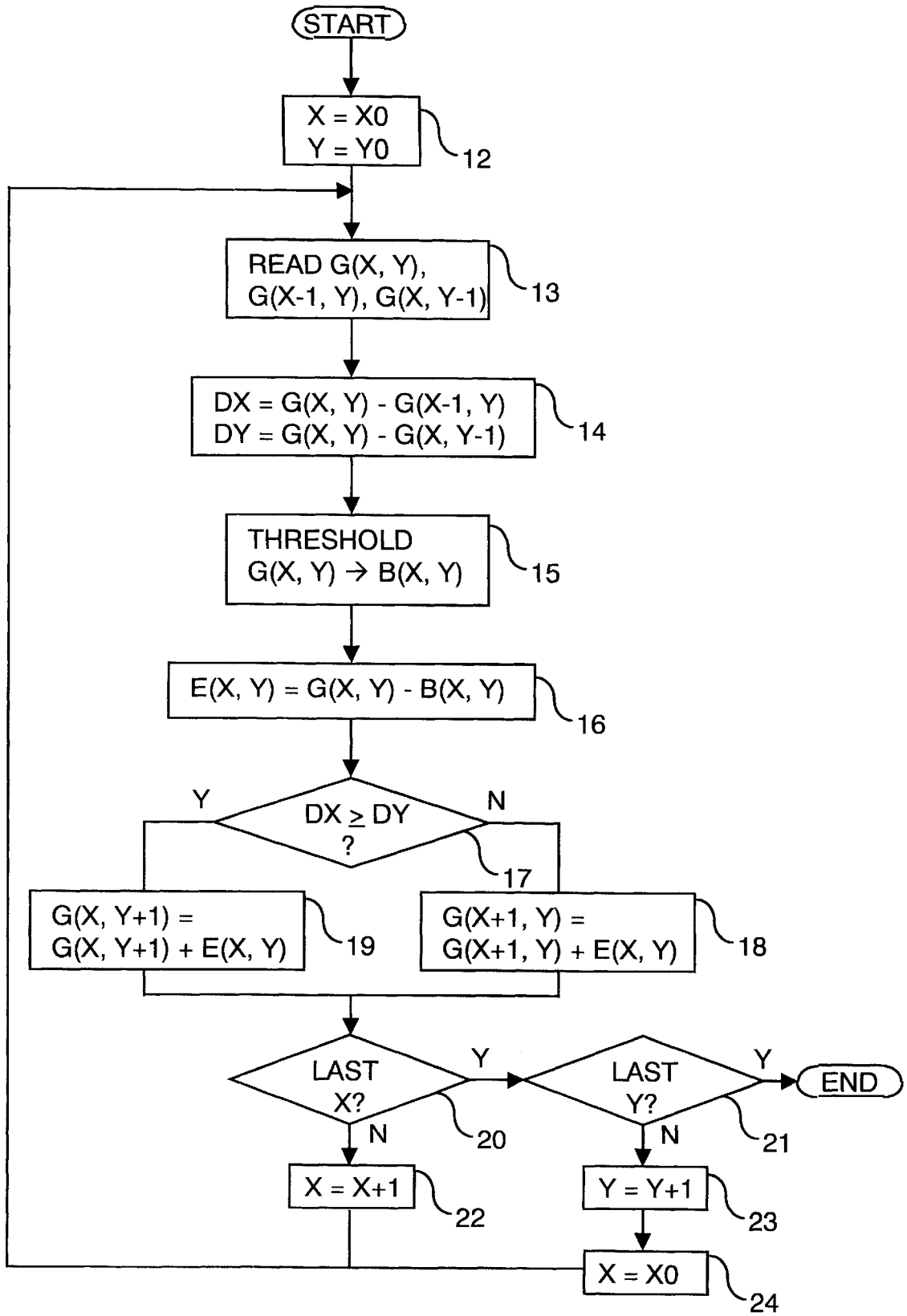
FIG. 6 is a flow diagram of a first method according to the invention.

FIG. 6 shows a method according to the invention based on an embodiment according to FIG. 4A and FIG. 5A. In an initialisation step 12 the X or column counter and the Y or row counter respectively are set to start value X0 and Y0, corresponding to a first row and a first column of an image divided into rows and columns of pixels. In step 13, the grey values G(X,Y), G(X-1,Y) and G(X,Y-1) of the pixels at positions (X,Y), (X-1,Y) and (X,Y-1) are read. On the basis of these read grey values G, a difference DX in grey value in the X or row direction and a difference DY in grey value in the Y or column direction are determined in a difference determining step 14. The grey value G(X,Y) of the pixel (X,Y) for thresholding is compared with a threshold T in the threshold step 15. In the case of a value above this threshold T, the pixel (X,Y) is given a first, and in the case of a value beneath this threshold, a second of two possible values B(X,Y).

In a quantisation error determining step 16 the quantisation error E is determined as being the difference between the quantised value B(X,Y) and the corresponding grey value G(X,Y). In step 17 the values of the previously determined differences DX and DY in grey values are compared with one another. If the grey value difference DX in the X direction is larger than or equal to the difference DY in the Y direction, the quantisation error E(X,Y) is added in step 18 to the grey value G(X,Y+1) of the pixel (X,Y+1) situated in the Y direction. In the other case, if the difference DY in grey value in the Y direction is greater than the difference in grey value in the X direction, the quantisation error E(X,Y) is added, in step 19, to the grey value G(X+1,Y) of the pixel (X+1,Y) situated in the X direction. These method steps are repeated successively for ascending values of the column counter X for each value of the row counter Y.

In steps 20 and 21 respectively a check is made whether the column counter X and the row counter Y respectively have reached a maximum value. The counters are always increased by one in steps 22 and 23, the column counter X always being reset to the start value X0 in step 24 after reaching a maximum value.

Figure 7:
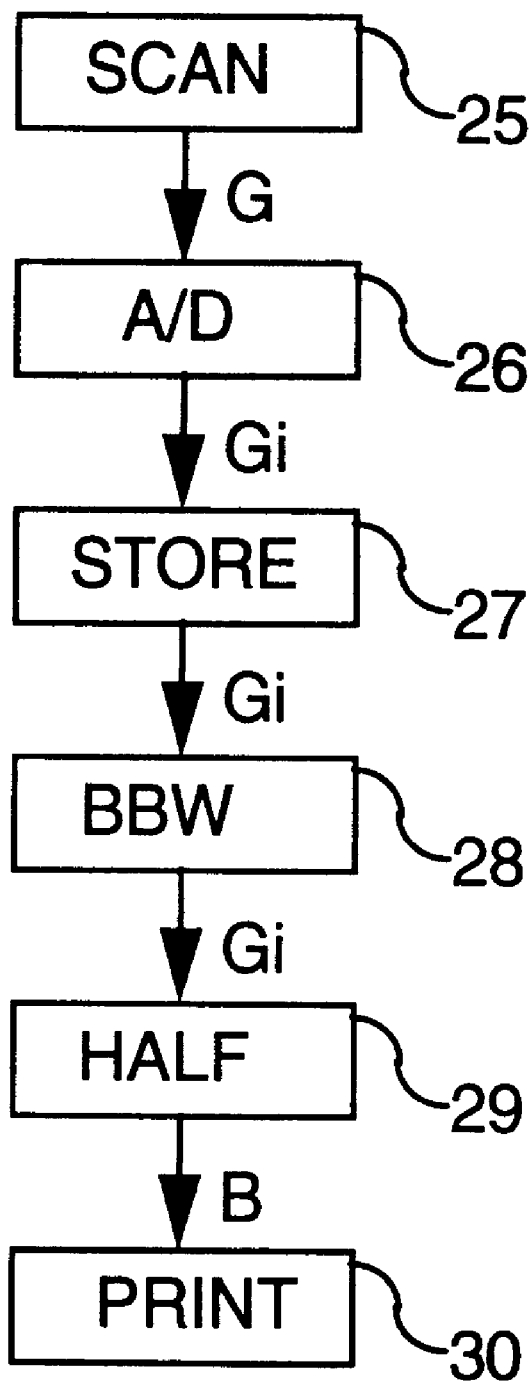
FIG. 7 is a diagram of an image reproduction apparatus according to the invention.

FIG. 7 is a diagram of an image reproduction apparatus according to the invention. In this case the grey value signals G are obtained by photoelectric scanning of an original sheet by scanner unit 25 embodied, e.g., by a linear CCD array. The scanner unit 25 can either be integrated in the apparatus as in the case of a digital copier, or be located at a distance but coupled by a suitable data communications line, as in the case of a scanner/printer system. The analogue grey value signals G are converted by an analogue-digital converter 26 to digital grey value signals $G_i$.

The digital grey value signals $G_i$ are then stored in a page memory 27. A memory 27 of this kind can serve as a buffer or for generating images in the correct sequence for the purpose of printing the same. The grey value signals $G_i$ stored in the page memory 27 are fed to halftone unit 29 via image processing unit 28. Here the grey value signals $G_y$, which have in the meantime been processed by the image processing unit 28, are converted to bivalent pixel signals B suitable for supply to the bivalent printer unit 30.

Figure 8:
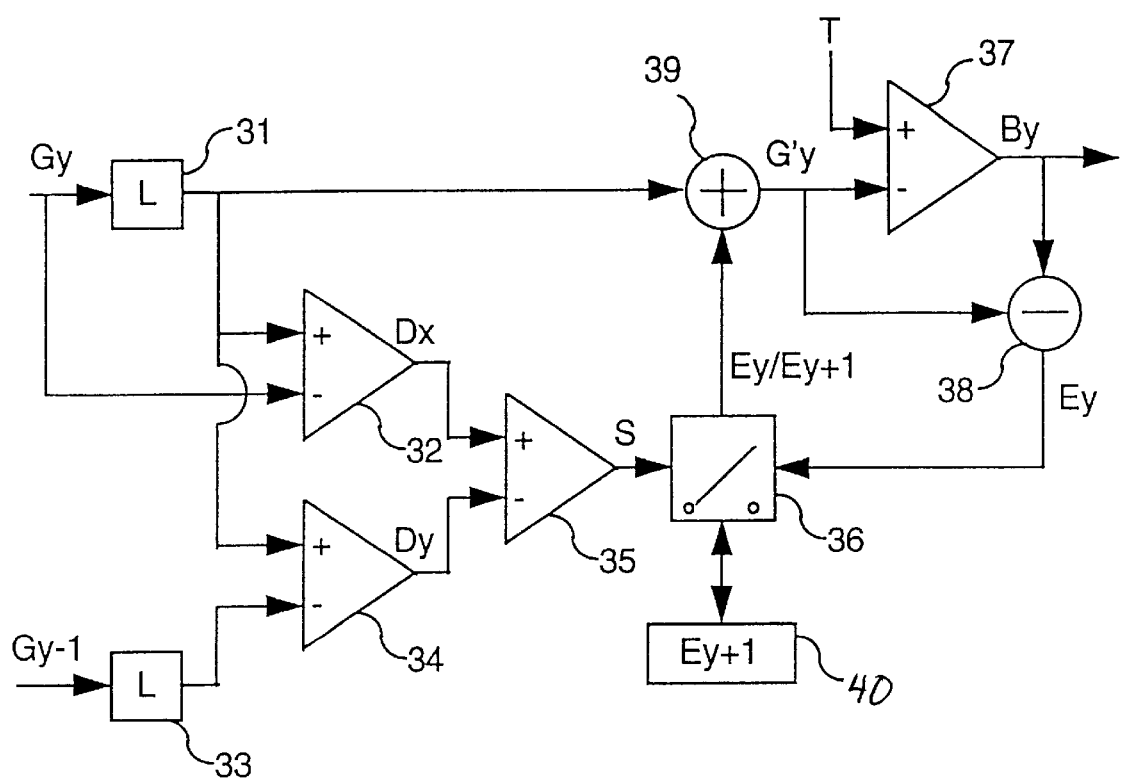
FIG. 8 is a diagram of another embodiment for halftoning of FIG. 7 in accordance with the invention.

The construction of the halftone unit 29 is also shown diagrammatically in FIG. 8. Here the grey value signals $G_y$ of a first row of pixels are fed successively to first memory 31 on the one hand and to a first input of first comparator 32 on the other hand. The output of the first memory 31 is connected to the second input of the first comparator 32. The first memory 31 provides a delay in transmission of the grey value signals stored therein, such that the inputs of the first comparator 32 receive grey value signals of two consecutive pixels in a row. At the output of the first comparator 32 the difference signal DX in grey value is available of the grey value signals supplied to the inputs. Here the X direction corresponds to the row direction.

In FIG. 8, grey value signals $G_{y-1}$ of a previous row of pixels are fed via second memory 33 to a first input of second comparator 34. The memory 33 provides a delay identical to the delay produced by the first memory 31. If the output of the first memory 31 is also connected to a second input of the second comparator 34 the output thereof delivers a difference signal DY in grey value of two pixels situated one above the other perpendicularly to the row direction. The outputs of the two comparators 32 and 33 respectively are in turn coupled to the respective inputs of third comparator 35. A selection signal S with either a first or a second logic value is generated depending on which input of the third comparator 35 is offered a higher signal.

This selection signal S is then fed to switching unit 36 to determine the selection of a quantisation error signal E. A quantisation error signal E of this kind is obtained by comparing the grey value signals $G_y$ fed to thresholding unit 37 with a threshold T. If this threshold T is exceeded, a first value of a bivalent pixel signal $B_y$ is generated and a second value thereof is generated if the threshold is not exceeded. The pixel signal $B_y$ generated is then compared in subtraction circuit 38 with a corresponding grey value signal $G_y$ of the same pixel which is also fed thereto.

The difference in value between these two signals is fed as a quantisation error signal $E_y$ to the switching unit 36. Depending on the position of the switching unit 36, said quantisation error signal $E_y$ is in one case added via addition unit 39 to a subsequent grey value signal $G_y$ of a following pixel situated consecutively in the same row, while in the other case it is fed to quantisation error memory unit 40 in order subsequently to be added to a grey value signal $G_{y+1}$ of a pixel of a following row, all in accordance with the method described in FIG. 6.

It should be noted that the required clock signals and synchronisation signals are not shown in the diagram since this will not give the average skilled man any problems. It should also be noted that the embodiment described gives a first example of one advantageous embodiment according to the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method of halftoning grey values of pixels obtained by a photoelectric canning of an image, the method comprising for a given pixel, the steps of:
   a) thresholding a grey value of the given pixel;
   b) determining a quantisation error associated with the given pixel;
   c) determining a first difference in grey values of not more than two pixels arrange on a first axis of the image and situated in a predetermined region relative to the given pixel;
   d) determining at least a second difference in grey values of not more than two pixel arranged on at least a second axis of the image different from the first axis and situated in said predetermined region;
   e) selecting a yet-to-be-threshold (YTBT) pixel arranged on one of the first or the at least second axis with respect to the given pixel, depending on the first and the second differences in grey values; and
   f) adding the quantisation error to the grey value of the selected pixel.

2. A method according to claim 1, wherein:
   said step e) includes the steps of
      g) selecting said YTBT pixel arranged on the first axis in the case in which said first difference in grey value is smaller than any second difference in grey value and
      h) selecting said YTBT pixel arranged on a second axis, substantially perpendicular to the first axis, in the case in which said first difference in grey value is greater than any second difference in grey value.

3. A method according to claim 2, wherein the pixels are organized into rows and columns of pixels, the first axis is parallel to the rows and the second axis is parallel to the columns;
   said step c) includes the step of i) determining said first difference in grey values of the given pixel and an adjoining pixel situated in the same row, and
   said step d) includes the step of j) determining said second difference in grey values of the grey pixel and an adjoining pixel situated in the same column;
   said step g) includes the step of k) selecting, in the case in which the first difference in grey values is smaller than the second difference in grey values, the other adjoining pixel situated in the same row; and
   said step h) includes the step of l) selecting in the case in which the first difference in grey value is greater than the second difference in grey values, the other adjoining pixel situated in the same column.

4. method according to claim 3, further comprising he steps of:
   m) determining a third difference in grey values of he given pixel and an adjoining pixel situated in a line diagonal to said rows and columns; and
   n) determining a fourth difference in grey values of he given pixel and an adjoining pixel situated in line perpendicular to said diagonal line;
   wherein said step e) includes the step of
      o) selecting, in the case in which the third difference in grey values is smaller than said first, second an fourth differences in grey values, the other adjoining ixel in the diagonal line; and
      p) selecting, in the case in which the third difference in grey values is greater than said first, second and fourth differences in grey values, the other adjoining pixel in said perpendicular line.

5. A method according to claim 2, wherein:
   the pixels are organized into rows and columns;
   said step c) includes the step of
      i) determining said first difference in grey values of the given pixel and an adjoining pixel situated in a line diagonal to said rows and columns;
   said step d) includes the step of
      j) determining said second difference in grey values of the given pixel and an adjoining pixel situated in a line perpendicular to said diagonal line;
   said step g) includes the step of
      k) selecting, in the case in which the first difference in grey values is smaller than the second difference in grey values, the other adjoining pixel in the diagonal line; and
   said step h) includes the step of
      l) selecting, in the case in which the first difference in grey values is greater than the second difference in grey values, the other adjoining pixel in said perpendicular line.

6. A method according to claim 1, wherein said predetermined region is defined by a 3×3 matrix of pixels, a center pixel of which is said given pixel.

7. method according to claim 1, wherein said predetermined region is defined by a 2×2 matrix of pixels, a pixel of which is said given pixel.

8. method according to claim 1, wherein said steps a)–f) are performed in alphabetical order.

9. A method according to claim 1, wherein the second axis is diagonal to the first axis.

10. A method according to claim 1, wherein said first difference represents a first gradient and the second difference represents a second gradient, and the YTBT pixel is selected so as to transfer the quantization error perpendicularly to the largest of the gradients.

11. An image reproduction apparatus for reproducing images on an image receiving support, the apparatus comprising:
   input means for receiving grey value signals of pixels obtained by photoelectric scanning of an image;
   quantization means for thresholding a grey value of a given pixel in order to obtain a thresholded signal of said given pixel;
   reproduction means for reproducing pixels in accordance with thresholded signals from said quantization means;
   error means for determining a quantization error signal corresponding to a difference between the grey value signal fed thereto and the corresponding thresholded signal of the pixel;

first difference means for generating a first grey value difference signal between not more than two grey value signals to be fed thereto of pixels arranged on a first axis in the image and which are situated in a predetermined region relative to the given pixel;

second difference means for generating at least a second grey value difference signal between not more than two grey value signals to be fed thereto of pixels arranged on a second axis differing from the first axis of the image and situated in said predetermined region;

selection means for generating a selection signal for selecting a pixel yet to be thresholded and situated either on one of the first or the at least second axis with respect to the given pixel, depending on the first and the second grey value difference signals; and addition means for adding the quantisation error signal to the grey value signal of the pixel selected in accordance with the selection signal.

12. Image reproduction apparatus according to claim 11, wherein said selection means is operable to select a pixel on the first axis if the first grey value difference signal is smaller than any second grey value difference signal and is operable to select a pixel on a second axis, substantially perpendicular to the first axis, if the first grey value difference signal is greater than the second grey value difference signal.

13. The image reproduction apparatus according to claim 12, wherein:

the pixels are organized into rows and columns of pixels;

the first axis is parallel to the rows and the second axis is parallel to the columns;

the first grey value difference signal is between grey value signals of the given pixel and an adjoining pixel situated in the same row;

the second grey value difference signal is between grey value signals of the given pixel and an adjoining pixel situated in the same column;

said selection means is operable to select the other adjoining pixel situated in the same row in the case in which the first grey value difference signal is smaller than the second grey value difference signal and is operable to select the other adjoining pixel situated in the same column in the case in which the first grey value signal is greater than the second grey value signal.

14. The image reproduction apparatus according to claim 13, further comprising:

third difference means for determining a third first difference in grey values of the given pixel and an adjoining pixel situated in a line diagonal to said rows and columns; and fourth difference means for determining a fourth difference in grey values of the given pixel and an adjoining pixel situated in a line perpendicular to said diagonal line;

wherein said selection means is operable to select, in the case in which the third difference in grey values is smaller than said first, second and fourth differences in grey values, the other adjoining pixel in the diagonal line, and said selection means is operable to select, in the case in which the third difference in grey values is greater than said first, second and fourth differences in grey values, the other adjoining pixel in said perpendicular line.

15. The image reproduction apparatus according to claim 12, wherein:

the pixels are organized into rows and columns;

said first difference means is operable to determine said first difference to be between grey values of the given pixel and an adjoining pixel situated in a line diagonal to said rows and columns;

said second difference means is operable to determine said second difference to be between grey values of the given pixel and an adjoining pixel situated in a line perpendicular to said diagonal line;

said selection means is operable to select, in the case in which the first difference in grey values is smaller than the second difference in grey values, the other adjoining pixel in the diagonal line; and said selection means is operable to select, in the case in which the first difference in grey values is greater than the second difference in grey values, the other adjoining pixel in said perpendicular line.

16. The image reproduction apparatus according to claim 11, wherein said predetermined region is defined by a 3×3 matrix of pixels, a center pixel of which is said given pixel.

17. The image reproduction apparatus according to claim 11, wherein said predetermined region is defined by a 2×2 matrix of pixels, a pixel of which is said given pixel.

18. The image reproduction apparatus according to claim 11, wherein the second axis is diagonal to the first axis.

19. The image reproduction apparatus according to claim 11, wherein said first difference represents a first gradient and the second difference represents a second gradient, and the selection means selects the YTBT pixel so as to transfer the quantization error perpendicularly to the largest of the gradients.

* * * * *